UNITED STATES PATENT OFFICE 2,464,519

PROCESS FOR MAKING A DIALLYL DICARBAMATE

Joy G. Lichty and Nelson V. Seeger, Cuyahoga Falls, Ohio, assignors to Wingfoot Corporation, Akron, Ohio, a corporation of Delaware No Drawing. Application October 17, 1945, Serial No. 622,940

1 Claim. (Cl. 260—468)

This invention relates to a new class of vinylidene dicarbamates and to the polymers thereof.

It has been discovered that the vinylidene dicarbamates of this invention may be readily polymerized to a hard, infusible, thermosetting and generally crystal clear polymeric mass. The dicarbamates are characterized by the presence of two vinylidene radicals (—R:CH$_2$) positioned in the ester group of the dicarbamate. The carbamyl groups (H$_2$NC:O—) are connected through a chain of at least two carbon atoms. It is this arrangement of atoms and the presence of these groups that permit the polymerization of these diesters to a mass having highly desirable characteristics.

The vinylidene dicarbamates have the general formula CH$_2$:R''O$_2$CNHRNHCO$_2$R':CH$_2$ and may be referred to as being a vinylidene diester of a dicarbamic acid having the general formula HO$_2$CNHRNHCO$_2$H in which R is an organic radical connecting the nitrogen atoms through a chain of at least 2 carbon atoms.

Generally these esters may be prepared by means of an addition reaction in which a diisocyanate (O:C:NRN:C:O) is reacted with a vinylidene alcohol (CH$_2$:R'OH) in the absence or presence of an addition catalyst, depending upon the starting material used. The reaction may be represented in a general way as follows:

Any organic diisocyanate having the nitrogen atoms separated by at least 2 carbon atoms may be used. Suitable diisocyanates are those in which the radical —R— is aliphatic, cycloaliphatic, aromatic, heterocyclic, alkylene (—R—), aralkylene (ArR—), cycloalkylene (CycloR—), arylene (—Ar—), alkarylene (R—Ar—), alkylenearylene (—A—Ar—), and heteroylene (-hetero-). In each case the nitrogen atom of the diisocyanate is separated by at least 2 carbon atoms.

Suitable alkylene radicals having the general formula (—C$_n$H$_{2n}$—) are ethylene, propylene, butylene, pentylene, hexylene, etc. Cycloaliphatic radicals that may be represented by —R— are cyclopentylene, cyclohexylene, etc. Aromatic radicals that may be represented by —R— are phenylene, naphthylene and aliphatic substituted phenylene radicals, such as 2,4-tolylene, 2,5-tolylene, etc. Suitable alkylenearylene radicals (—R—Ar) are methylenediphenylene, (—C$_6$H$_4$CH$_2$C$_6$H$_4$—), phenylenedimethylene (—CH$_2$C$_6$H$_4$CH$_2$—), etc.

A suitable heteroylene radical (-hetero-) is oxydipropylene (—C$_3$H$_6$—O—C$_3$H$_6$—), etc.

The vinylidene alcohols having the general formula CH$_2$:R'OH that may be condensed with the organic diisocyanate are allyl alcohol, 2-chlorallyl alcohol, 3-buten-1-ol (allylcarbinol), 3-buten-2-ol (methylvinylcarbinol), 1-penten-3-ol (ethylvinylcarbinol), 4-penten-1-ol ($\beta$-allylethylalcohol), 4-penten-2-ol (allylmethylcarbinol), 2-methyl-4-penten-2-ol (allyldimethylcarbinol), 3-ethyl-5-hexen-3-ol (allyldiethylcarbinol), 1,5-heptadiene-4-ol bupleurol (2-methyl-6-methylenoctan-8-ol), geraniol 2,6-dimethyl-1,6-octadien-8-ol), linalool (2,6-dimethyl-2,7-octadien-6-ol), ocimenol (2,6-dimethyl-1,7-octadien-6-ol), sabinol, $\beta$ terpineol (1-methyl-4-isopropenyl cyclohexan-1-ol), dihydrocarveol (1-methyl-4-isopropenyl-cyclohexan-2-ol), carveol (1-methyl-4-isopropenyl-6-cyclohexen-2-ol), isopulegol (1-methyl-4-isopropenyl cyclohexan-3-ol), perillyl alcohol (4-isopropenyl-1-cyclohexene carbinol), 2-allyl-1-phenethyl-cyclohexanol, 1-vinylcyclohexanol, etc.

Another method of preparing these vinylidene dicarbamates comprises the reaction of a diamine with a divinylidene carbonate at a temperature and for a time sufficient to cause the elimination of an alcohol. Generally, the reaction may be carried out at a temperature between about 100° C.–160° C. for about 1 hour to about 16 hours, depending upon the starting materials used.

Alkylene diamines having the general formula H$_2$NC$_n$H$_{2n}$NH$_2$ that may be used are ethylene diamine, propylene diamine, butylene diamine, amylene diamine, hexylene diamine, decylene diamine, etc. Cycloaliphatic diamines that may be used are 1,4 cyclohexylene diamine, 1,3 cyclopentylene diamine, etc. Aromatic diamines that may be used are o-, p-, and m-phenylene diamine, toluidine diamines as 2,4 toluidine diamine, p,p'diamino diphenyl methane, etc. Heterocyclic diamines may be used, as 2,5 diamino pyridine, etc. Aralkylene diamines may be used, as phenylethylene diamine, etc.

The vinylidene carbonates that may be used are diallylcarbonate, bis (methallyl) carbonate, bis (chlorallyl) carbonate and the carbonates of the vinylidene alcohols hereinbefore mentioned prepared by means of the reaction of phosgene with the alcohol in the molar ratio of 1 to 2.

Still another method for preparing these vinylidene dicarbamates comprises the reaction of a diamine (above described) with a vinylidene formyl chloride (CH$_2$:ROCOCl). The vinylidene formyl chloride is prepared by reacting a vinylidene alcohol with phosgene. Vinyl formyl chloride is prepared as shown in U. S. 2,377,085.

The following examples illustrate specific embodiments of the invention. It should be understood, however, that these examples are intended to be illustrative only, and are not intended to limit the scope of the invention. The term "parts" whenever hereinafter used signifies "parts by weight."

EXAMPLE 1

*Hexamethylene bis(allyl carbamate) and polymer*

One-half mol (29 grams) of allyl alcohol was added to ¼ mol (21 grams) of hexamethylene diisocyanate. An exothermic reaction took place and a white, low-melting solid separated. The product recrystallized from a mixture of acetone and hexane, melted at 60–90° C. and was identified as being hexamethylene bis (allyl-carbamate).

The carbamate was heated at a temperature of 90–95° C. for 24 hours in the presence of a catalytic amount of tertiary-butyl hydroperoxide to produce a solid, transparent, infusible, glass-like polymeric resin.

EXAMPLE 2

*Ethylene bis(allylcarbamate) and polymer*

One mol of ethylene diamine was added to 2 mols of diallyl carbonate and the mixture heated first at a temperature of 110° C. for 16 hours and then at a temperature of 150° C. for 8 hours to give a 75% yield of ethylene bis(allyl carbamate). This material polymerized in the presence of a catalytic amount of tertiary butyl hydroperoxide when heated at a temperature of 90–95° C. for 24 hours to a hard, transparent, infusible, thermosetting resin.

EXAMPLE 3

*Ethylene bis(methallyl carbamate) and polymer*

One mol of ethylene diamine was added to 2 mols of dimethallyl carbonate and the mixture heated at 110° C. for 16 hours and then at a temperature of 150° C. for 8 hours. A yield of 70% of a product identified as ethylene bis(methallyl carbamate) was recovered, and heated at a temperature of 90–95° C. for 24 hours in the presence of a catalytic amount of tertiary butyl hydroperoxide to produce a hard, thermosetting, infusible, polymeric mass.

EXAMPLE 4

*Hexamethylene bis(methallyl carbamate) and polymer*

One mol of hexamethylene diamine was added to 2 mols of dimethylallyl carbonate and the mixture heated at a temperature of 115° C. for 15 hours and then at 145° C. for 9 hours to produce a reaction mass from which was recovered a yield of 73% of a product identified as being hexamethylene bis(methallyl carbamate). This ester was heated at a temperature of 110° C. for 24 hours in the presence of 1–2% of tertiary-butyl hydroperoxide to produce an opaque, thermosetting, infusible, hard, polymeric resin.

The polymerization of the carbamates of this invention may be generally effected by means of heat alone. However, polymerization is aided in the presence of a catalyst, for example an oxygen-producing polymerization catalyst, such as sodium peroxide, benzoyl peroxide, sodium perborate and tertiary butyl hydroperoxide. The catalyst may be used in an amount between about 0.5% and about 4%. Generally, the catalyst is used in an amount between about 1% and about 2%. The temperature for the polymerization may be any temperature below the decomposition of the polymer. Generally, a temperature between about 80° C. and about 150° C. is satisfactory, depending in each case upon the particular carbamate being polymerized.

This is a continuation-in-part application of our application Serial No. 500,932, filed September 2, 1943, abandoned.

Suitable changes may be made in the details of the process without departing from the spirit or scope of the present invention, the proper limits of which are defined in the appended claim.

We claim:

The method of producing a dicarbamate which comprises reacting two mols of diallyl carbonate with one mol of a diamine having the general formula $H_2NRNH_2$ in which R is taken from the group consisting of cyclopentylene and cyclohexylene radicals, the nitrogen atoms being connected through at least two carbon atoms, until the reaction is complete.

JOY G. LICHTY.
NELSON V. SEEGER.

REFERENCES CITED

The following references are of record in the file of this patent:

UNITED STATES PATENTS

| Number | Name | Date |
|---|---|---|
| 1,927,858 | Ulrich et al. | Sept. 26, 1933 |
| 2,277,083 | Dorough | Mar. 24, 1942 |
| 2,384,074 | Chenicek I | Sept. 4, 1945 |
| 2,385,911 | Chenicek II | Oct. 2, 1945 |
| 2,394,592 | Chenicek III | Feb. 12, 1946 |
| 2,395,750 | Muskat et al. | Feb. 26, 1946 |